United States Patent [19]  [11] 4,043,967
Berg  [45] Aug. 23, 1977

[54] LATENTIZING SOLVENTS FOR EPOXY SYSTEMS

[75] Inventor: Eric P. Berg, Woodbury, Minn.

[73] Assignee: Minnesota Mining and Manufacturing Company, St. Paul, Minn.

[21] Appl. No.: 659,792

[22] Filed: Feb. 20, 1976

[51] Int. Cl.² .................. C08K 5/01; C08K 5/06; C08K 5/11; C08K 5/15
[52] U.S. Cl. .................. 260/30.4 EP; 260/2 A; 260/2 EC; 260/29.2 EP; 260/31.2 R; 260/31.8 R; 260/31.8 E; 260/31.8 S; 260/33.2 EP; 260/33.6 EP
[58] Field of Search .......... 260/30.4 EP, 31.8 E, 260/31.8 R, 33.2 EP, 33.6 EP, 31.8 S, 31.8 M, 31.2 R

[56] References Cited

U.S. PATENT DOCUMENTS

| | | | |
|---|---|---|---|
| 3,389,114 | 6/1968 | Burzynski et al. | 260/32.8 |
| 3,389,121 | 6/1968 | Burzynski et al. | 260/46.5 |
| 3,586,616 | 6/1971 | Kropp | 204/159.11 |
| 3,632,843 | 1/1972 | Allen et al. | 260/2 EC |
| 3,704,311 | 11/1972 | Koshar | 260/486 H |
| 3,758,531 | 9/1973 | Koshar | 260/400 |
| 3,758,591 | 9/1973 | Koshar | 260/607 A |
| 3,758,592 | 9/1973 | Koshar | 260/607 A |
| 3,758,593 | 9/1973 | Koshar | 260/607 A |
| 3,776,960 | 12/1973 | Koshar et al. | 260/607 A |

Primary Examiner—Stanford M. Levin
Attorney, Agent, or Firm—Cruzan Alexander; Donald M. Sell; Mark A. Litman

[57] ABSTRACT

The catalytic activity of bis(highly fluorinated aliphatic sulfonyl) methanes is latentized by ether, ester and aromatic solvents in epoxy resin polymerizable systems.

15 Claims, No Drawings

LATENTIZING SOLVENTS FOR EPOXY SYSTEMS

Among the best catalysts for epoxy resins are the bis (highly fluorinated aliphatic sulfonyl) methanes. These catalysts are very efficient, requiring only small concentrations, and are also very active, polymerizing epoxy resins at ambient temperatures or low heat. They are, in fact, such active catalysts that certain types of processing can be complicated by the rapid polymerization caused by their addition to epoxy systems. For example, if the catalyst were added to epoxy coating compositions to be spray coated, it would take only a few minutes for the coating composition to become viscous. The use of conventional solvents does not overcome this problem, because the solvents generally used merely thin out the composition and do not prevent the formation of long polymer chains. Furthermore, large amounts of solvents would create further coating problems by thinning out the solution so greatly as to reduce its solids coating weight and therefore increase the probability of coating imperfections.

Latent catalytic derivatives of these fluorinated catalysts have been made and they do offer processing advantages over the active catalysts. These latent catalysts, such as those disclosed in U.S. Pat. Nos. 3,586,616 and 3,632,843, are also very efficient catalysts, but require heat to activate or delatentize them. This prevents their use in many applications where ambient temperatures are desirable or necessary.

It is one aspect of this invention to show latent polymerizable systems of epoxy resins and bis (highly fluorinated aliphatic sulfonyl) methanes which do not require more than ambient temperatures to effect delatentization of the systems.

It is one aspect of the present invention to show latent polymerizable systems of epoxy-terminated silanes in anhydrous association with bis (highly fluorinated aliphatic sulfonyl) methanes which can be delatentized at ambient temperatures.

It is also one aspect of the present invention to show latent copolymerizable systems of epoxy resins, epoxy-terminated silanes, and silanes in association with bis (highly fluorinated aliphatic sulfonyl)methanes.

It has been found in the present invention that volatile liquid solvents selected from esters, ethers and aromatic organic compounds comprised of only carbon, hydrogen and oxygen and having a vapor pressure at 25° C between 0.10 torr and 650 torr act as latentizing agents for bis (highly fluorinated aliphatic sulfonyl) methanes in epoxy resin systems.

The stable polymer systems of this invention are polymerizable mixtures comprising aliphatic epoxy monomers, precondensates of epoxy resins, and mixtures thereof or anhydrous systems comprising epoxy-terminated silanes or their precondensates which may further contain epoxy monomers, epoxy resin precondensates, silanes or mixtures thereof. The systems containing silanes must be anhydrous for long-term stability as water promotes condensation of the silane groups. Systems containing water are within the practice of this invention insofar as polymerization therein is still retarded (for only the epoxy groups) by the inhibiting solvents and thereby facilitates the use of those compositions.

Preferred monomeric components of the present invention are aliphatic epoxides and epoxy-terminated silanes. Aliphatic epoxides are compounds of carbon, hydrogen, and oxygen having at least one epoxy group and no aromatic moieties.

Epoxy terminated silane may be represented by the formulae:

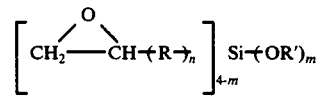

and

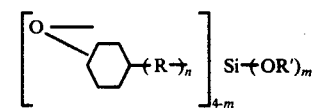

wherein,
each R is independently a divalent hydrocarbon radical of less than 20 carbon atoms, or a divalent radical of less than 20 carbon atoms the backbone of which is C atoms which may be interrupted by individual atoms of O in the form of ether linkages,
$m$ is 1, 2 or 3,
$n$ is 0, or 1, and
R' is an aliphatic hydrocarbon radical of less than 10 carbon atoms, an acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

In the practice of the present invention it is not preferred to use epoxy resins, monomers, or copolymerizable materials which contain basic N, divalent S, or aromatic moieties as these retard the activity of the catalyst and, as they are not fugitive from the system, remain to retard the catalyst. They are tolerable in the system in less than molar proportions to the catalyst. That is, the epoxies and comonomers must not constitute a total of N, S, and aromatic moieties equal to the molar proportion of the catalyst.

Siloxane partial condensation products as described in U.S. Pat. Nos. 3,389,114 and 3,389,121 are particularly useful in the practice of the present invention. These are precondensates of silanes and epoxy-terminated silanes.

The catalysts of the present invention, the bis (highly fluorinated aliphatic sulfonyl) methanes may be represented by the formulae:

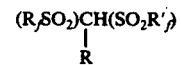

wherein
$R_f$ and $R'_f$ are independently a highly fluorinated alkyl group, and
R is selected from H, Br, Cl, I, alkyl groups of 1 to 20 carbon atoms, aryl or aralkyl of up to 20 carbon atoms, or R'-X wherein R' is an alkylene group of up to 4 carbon atoms, and X is H, Br, Cl, or I.

In the practice of this invention, $R_f$ and $R'_f$ are independently defined by highly fluorinated aliphatic radical which encompasses fluorinated, saturated, monovalent, aliphatic radicals having 1 to 20 carbon atoms. The skeletal chain of the radical may be straight, branched or, if sufficiently large (e.g. at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $$C_xF_{2x+1}$$

wherein x has a value from 1 to 18.

As previously described, the latentizing solvents of the present invention are volatile liquid solvents from the class of ethers, esters and aromatic compounds comprised of only C, H, and O atoms and having a vapor pressure at 25° C between 0.10 and 650 torr. Preferably, these solvents have no more than 10 carbon atoms, and include such solvents as alkyl and aryl esters (e.g., alkyl acetates such as ethyl acetate, methyl benzoate, diethyl oxalate, ethyl carbonate, butyl acetate, ethyl formate, octyl acetate, isopropyl acetate, etc.) aryl and alkyl ethers (e.g., t-butyl methyl ether, phenylmethyl ether furan, p-dioxane), and aromatic compounds (e.g., toluene, xylene, mesitylene). These solvents must not be reactive with the polymerizable components of the epoxy (polymeric) system.

These latentizing solvents may be delatentized by allowing the solvent to volatilize and evaporate from the system. Once removed from the system, the catalyst becomes active and the system will polymerize. Certain other solvents have been found to latentize the catalyst (e.g., dimethyl sulfoxide, dimethyl formamide, dimethyl acetamide), but these require heat to delatentize them and therefore are not effective in overcoming the shortcomings of other latent systems.

The polymerizable systems of this invention may of course contain neutral fillers such as talc and silica, but again, any further additives to the system must not raise the molar proportions of basic N, divalent S (e.g., C—S—C), or aromatic groups up to the molar proportions of the catalysts.

The degree of latentization of the polymerizable system is proportional to the relative concentrations of epoxy polymerizable materials and the latentizing solvents. Although substantially lesser amounts of solvent may be used (e.g., 10 or 20%) it is generally preferred to have an amount of solvent equal to 30% of the weight of the epoxy containing polymerizable systems, more preferred to have 1:1 ratio of solvent to epoxy polymerizable monomer. For example, in a system containing 100 parts by weight of an epoxy-terminated silane, 10 parts epoxy resin, and 20 parts silane, a 1:1 ratio would be 110 parts of solvent.

Silanes as used in the practice of the present invention are compounds of the formula:

$$X_mSiR_{4-m}$$

wherein
X is alkoxy, acetoxy, acyloxy, and aryloxy (preferably no more than 10 carbon atoms and preferably alkoxy)
R is hydrogen or hydrocarbyl (any moiety attached through a carbon atom, as where a hydrogen has been removed, preferably having no more than 10 carbon atoms, and preferably alkyl, aryl, and aralkyl), and
m is 2, 3, or 4.

The terms alkyl, alkoxy, aryl, aryloxy, etc. as used generally in the present case include those substituted groups recognized in the art as being functional equivalents of the group. For example, alkyl would include —CH$_2$CH$_2$Cl.

The present invention will be further described by the following examples.

EXAMPLE 1

Ten grams of 1,4-butanediol diglycidyl ether was catalyzed with 0.10g of bis(perfluoromethylsulfonyl)methane. The resulting solution exothermed violently, turned black and formed a brittle solid in less than one minute.

EXAMPLE 2

Ten grams of 1,4-butanediol diglycidyl ether was dissolved in 10 grams of CH$_2$Cl$_2$ and 0.10g of bis(perfluoromethylsulfonyl)methane was added. The resulting solution exothermed and formed a hard gel in a few minutes.

EXAMPLE 3

Ten grams of 1,4-butanediol diglycidyl ether was dissolved in 10 grams of ethyl acetate and 0.10g bis(perfluoromethylsulfonyl)methane was added. The resulting solution was capped and checked for gelation ca. every 15 minutes. A small amount of catalyzed solution was removed periodically and spread as a thin film on a microscope slide. After 10 minutes at room temperature thin films cured to a tack free state. The catalyzed solution gelled after 24 hours, 23 minutes at room temperature. Gelation time is measured by placing the composition in an air tight container (so that solvent will not evaporate) and measuring the gel time. This measures the latentizing effect of the solvent.

EXAMPLE 4

A solution of 1,4-butanediol diglycidyl ether in benzene was prepared and catalyzed with the catalyst of EXAMPLE 3. Thin films cured at room temperature in ca. 10 minutes and the catalyzed solution gelled in 22 hours, 33 minutes.

EXAMPLE 5

A solution of 1,4-butanediol diglycidyl ether in ethyl ether was prepared and catalyzed with the catalyst of Example 3. Thin films cured at room temperature in 14 minutes and the catalyzed solution gelled in 18 hours. It is to be noted in examples using the 1,4-butanediol diglycidyl ether as the monomer that this is an extremely reactive material and that the catalysts are extremely reactive. Any significant delay in the gelation time (e.g., greater than 1 or 2 hours) is noteworthy—if not remarkable.

EXAMPLES 6-14

This example illustrates that the latency effect exhibited by ethyl acetate, benzene and ethyl ether on epoxy resin/disulfone systems, as shown in the previous examples, is a general effect of these solvent classes (esters, ethers, and aromatics).

| Solvent | Gel Time at R.T. | Thin Film Cures at R.T. |
| --- | --- | --- |
| Ethyl formate | 27 hrs., 27 min. | 11 min. |
| Butyl acetate | 23 hrs., 23 min. | 14 min. |
| Isopentyl acetate | 24 hrs., 50 min. | 21 min. |
| Toluene | 22 hrs., 30 min. | 11 min. |
| Xylene | 18 hrs., 29 min. | 18 min. |
| Mesitylene | 18 hrs., 26 min. | 25 min. |
| Furan | 10 hrs., 47 min. | 13 min. |
| p-dioxane | 21 hrs., 30 min. | 18 min. |
| t-butyl methyl ether | 13 hrs., 20 min. | 13 min. |

All systems used a 1:1 weight ratio of solvent to 1,4-butanediol diglycidyl ether and 1% by weight $CH_2(CF_3SO_2)_2$.

EXAMPLE 15

1,4-butanediol diglycidyl ether was dissolved in o-dichlorobenzene and catalyzed with the catalyst of Example 3. Gelation occurred in 24 minutes at room temperature (this shows that electron availability in the solvent plays an important role in this latency effect).

EXAMPLE 16

1,4-butanediol diglycidyl ether was dissolved in nitromethane and catalyzed with the catalyst of Example 3. Gelation occurred in less than 30 minutes at room temperature. (This shows that solvents containing nitro groups will not work well in this invention.)

EXAMPLE 17

Anhydrous γ-glycidoxypropyltrimethoxysilane (10.0g) was catalyzed with 0.10g bis(perfluoromethylsulfonyl)methane and the resultant solution kept at room temperature in a screw cap vial. Thin films of this solution cured to a tack-free state in ca. 5 minutes. The solution gelled in 12 days at room temperature. This provides a standard for comparing the latentizing effect of the solvents according to the present invention.

EXAMPLE 18

10g of anhydrous γ-glycidoxypropyltrimethoxy silane was dissolved in 10g ethyl acetate and catalyzed with 0.10g. Thin films cured at room temperature and gelation occurs at greater than 120 days.

EXAMPLE 19

The same procedure was used in this example as in Example 10 only ethyl ether was the solvent. Thin films cured readily at room temperature and gelation occurs at greater than 120 days.

EXAMPLE 20

Ten grams of 1,4-butanediol diglycidyl ether was dissolved in 10g isopentyl acetate and 0.10g $CHBr(CF_3SO_2)_2$ was added. Gelation of this solution occurred in ca. 22 hours at room temperature.

EXAMPLE 21

A sample was prepared as in Example 13 but ethyl ether was the solvent. The solution gelled in 9 hours at room temperature.

EXAMPLE 22

A sample was prepared as in Example 13 but $CH_2Cl_2$ was the solvent. An immediate exotherm resulted and the solution gelled in <15 minutes. It is to be noted that the catalyst of Examples 13-15 is amongst the most active of the sulfone catalysts and the monomer, as previously noted, is very active. Delay of gel time to 9 hours in Example 14 is rather remarkable when compared to the results of equal amounts of conventional solvents in Example 15.

ADDITIONAL EXAMPLES—EXAMPLES 23–40

The experiments with all the solvents described in Example 6 were repeated using $PhCH(CF_3SO_2)_2$ and $C_4H_9CH(CF_3SO_2)_2$ and the results were similar to that found when $CH_2(CF_3SO_2)_2$ was used as catalyst.

The practice of this invention is limited to the class of catalysts described, the bis(highly fluorinated aliphatic sulfonyl)methanes. The solvents were tried in conjunction with other catalyst systems such as $BF_3$ complexes, trifluoromethyl sulfonic acid, $CF_3COOH$ and $C_4F_9SO_2NHSO_2CF_3$ but no significant effect was noted.

What is claimed is:

1. A latent polymerizable epoxy material comprising a polymerizable epoxy monomer or precondensate, a catalytically active amount of a bis(highly fluorinated aliphatic sulfonyl)methane, and a volatile, liquid solvent selected from ethers, esters, and aromatic compounds which are not reactive with said epoxy material, said solvents comprised of only C, H and O atoms and having a vapor pressure at 25° C between 0.10 and 650 torr, said solvent being present in an amount at least equal to 10% of the weight of said polymerizable epoxy material.

2. The latent material of claim 1 wherein said polymerizable epoxy material includes an epoxy-terminated silane of the formula:

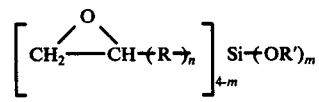

and

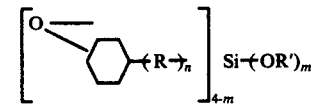

wherein,
each R is independently a divalent hydrocarbon radical of less than 20 carbon atoms, or a divalent radical of less than 20 carbon atoms the backbone of which is C atoms which may be interrupted by individual O atoms in the form of ether linkages,
m is 1, 2, or 3,
n is 0, or 1, and
R' is an aliphatic hydrocarbon radical of less than 10 carbon atoms, an acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

3. The latent material of claim 1 wherein the polymerizable material is chosen from the group consisting essentially of:
1. polymerizable aliphatic epoxy materials,
2. epoxy-terminated silanes,
3. polymerizable aliphatic epoxy materials, and epoxy-terminated silanes,
4. epoxy-terminated silanes and silanes,
5. epoxy-terminated silanes, polymerizable aliphatic epoxy materials, and silanes, and 6. anhydrous systems of (2) – (5).

4. The latent material of claim 1 wherein said volatile liquid solvent is present in an amount at least equal to 30% of the weight of polymerizable epoxy material.

5. The latent material of claim 2 wherein said volatile liquid solvent is present in an amount at least equal to 30% of the weight of polymerizable epoxy material.

6. The latent material of claim 3 wherein said volatile liquid solvent is present in an amount at least equal to 30% of the weight of polymerizable epoxy material.

7. The latent material of claim 4 wherein said bis(-highly fluorinated aliphatic sulfonyl)methane is a bis(-perfluoroalkylsulfonyl)methane.

8. The latent material of claim 5 wherein said bis(-highly fluorinated aliphatic sulfonyl)methane is a bis(-perfluoroalkylsulfonyl)methane.

9. The latent material of claim 6 wherein said bis(-highly fluorinated aliphatic sulfonyl)methane is a bis(-perfluoroalkylsulfonyl)methane.

10. The latent material of claim 7 wherein said volatile liquid solvent is selected from aryl or alkyl esters, aryl or alkyl ethers, and aromatic solvents having no more than 10 carbon atoms.

11. The latent material of claim 8 wherein said volatile liquid solvent is selected from aryl or alkyl esters, aryl or alkyl ethers, and aromatic solvents having no more than 10 carbon atoms.

12. The latent material of claim 9 wherein said volatile liquid solvent is selected from aryl or alkyl esters, aryl or alkyl ethers, and aromatic solvents having no more than 10 carbon atoms.

13. The latent material of claim 10 wherein the solvent is present in an amount at least equal to 60% of the weight of polymerizable epoxy material and the bis(-highly fluorinated aliphatic sulfonyl)methane is of the formula:

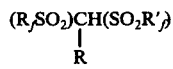

wherein
$R_f$ and $R'_f$ are independently perfluoroalkyl of 1 to 20 carbon atoms, and
R is H, Cl, Br, I, alkyl groups of 1 to 20 carbon atoms, aryl or aralkyl of up to 20 carbon atoms, or R'X wherein R' is an alkylene group of up to 4 carbon atoms and X is H, Br, Cl, I.

14. The latent material of claim 11 wherein the solvent is present in an amount at least equal to 60% of the weight of polymerizable epoxy material and the bis(-highly fluorinated aliphatic sulfonyl)methane is of the formula

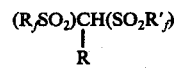

wherein
$R_f$ and $R'_f$ are independently perfluoroalkyl of 1 to 20 carbon atoms, and
R is H, Cl, Br, I, alkyl groups of 1 to 20 carbon atoms, aryl or aralkyl of up to 20 carbon atoms, or R'X wherein R' is an alkylene group of up to 4 carbon atoms and X is H, Br, Cl, I.

15. The latent material of claim 12 wherein the solvent is present in an amount at least equal to 60% of the weight of polymerizable epoxy material and the bis(-highly fluorinated aliphatic sulfonyl)methane is of the formula:

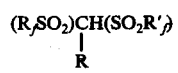

wherein
$R_f$ and $R'_f$ are independently perfluoroalkyl of 1 to 20 carbon atoms, and
R is H, Cl, Br, I, alkyl groups of 1 to 20 carbon atoms, aryl or aralkyl of up to 20 carbon atoms, or R'X wherein R' is an alkylene group of up to 4 carbon atoms and X is H, Br, Cl, I.

* * * * *